(12) United States Patent
Cuevas Vega et al.

(10) Patent No.: US 10,343,614 B2
(45) Date of Patent: Jul. 9, 2019

(54) VEHICLE WITH INTEGRATED CARRYING RACK

(71) Applicant: Ford Global Technologies, LLC, Dearborn, MI (US)

(72) Inventors: Alfredo Cuevas Vega, Santiago Tianguistenco (MX); Hector Hernandez, Lerma (MX); Rafael Lugo Segura, Mexico City (MX); Miguel Angel Velazquez Lopez, Mexico City (MX)

(73) Assignee: Ford Global Technologies, LLC, Dearborn, MI (US)

(*) Notice: Subject to any disclaimer, the term of this patent is extended or adjusted under 35 U.S.C. 154(b) by 264 days.

(21) Appl. No.: 15/235,652

(22) Filed: Aug. 12, 2016

(65) Prior Publication Data

US 2018/0043836 A1    Feb. 15, 2018

(51) Int. Cl.
*B60R 9/06* (2006.01)
*B60R 9/10* (2006.01)

(52) U.S. Cl.
CPC . *B60R 9/06* (2013.01); *B60R 9/10* (2013.01)

(58) Field of Classification Search
CPC .. B60R 9/10; B60R 9/06; B60R 19/48; B60R 2011/0085; B60R 2011/0087; B60R 2011/0092; B60R 9/08; B60R 2011/0082
USPC ....... 224/282, 489, 488, 491, 495, 497, 502, 224/504, 503, 924, 499
See application file for complete search history.

(56) References Cited

U.S. PATENT DOCUMENTS

| | | | | | |
|---|---|---|---|---|---|
| 3,542,264 | A | * | 11/1970 | Meyer | B60R 9/00 105/381 |
| 4,403,716 | A | * | 9/1983 | Carlson | B60R 9/06 224/485 |
| 9,174,584 | B1 | * | 11/2015 | Cha | B60R 9/10 |
| 2007/0039987 | A1 | * | 2/2007 | Osenkowski | B62D 43/002 224/504 |
| 2008/0142559 | A1 | | 6/2008 | Lim et al. | |
| 2016/0107583 | A1 | * | 4/2016 | Krishnan | B60R 9/06 224/536 |

FOREIGN PATENT DOCUMENTS

| | | | | |
|---|---|---|---|---|
| DE | 10345844 A1 | | 5/2005 | |
| DE | 202005012475 U1 | | 11/2005 | |
| DE | 102007024971 A1 | * | 12/2008 | .............. B60J 5/103 |
| DE | 102011121400 | * | 6/2013 | .............. B60R 9/06 |
| DE | 102011121400 A1 | * | 6/2013 | .............. B60R 9/06 |
| FR | 2820382 | * | 8/2002 | .............. B60R 9/06 |
| FR | 2820382 A1 | * | 8/2002 | .............. B60R 9/06 |

* cited by examiner

*Primary Examiner* — Nathan J Newhouse
*Assistant Examiner* — Matthew T Theis
(74) *Attorney, Agent, or Firm* — Vichit Chea; Brooks Kushman P.C.

(57) ABSTRACT

A rack for supporting an article on a rear hatch of a vehicle includes a bracket mounted to an inner panel of the rear hatch. The rack also includes a hinge having a fixed portion mounted to the bracket and a pivotable portion. A support bar is connected to the pivotable portion and includes an article-receiving member. The support bar is pivotable via the hinge between a stowed position in which the support bar is nested with the rear hatch and a carrying position in which the support bar extends outwardly from the rear hatch allowing an article to be disposed on the article-receiving member.

14 Claims, 5 Drawing Sheets

VEHICLE WITH INTEGRATED CARRYING RACK

TECHNICAL FIELD

The present disclosure relates to a vehicle including an integrated article-carrying rack deployable from a body panel of the vehicle.

BACKGROUND

Aftermarket bicycle racks allow customers to attach bicycles to a vehicle. Some aftermarket bicycle racks include a portion that supports the bicycles and a portion that mounts to the trailer-hitch receiver. These aftermarket bicycle racks prevent the rear hatch of the vehicle from opening when they are attached and require storage space when disconnected from the vehicle.

The present disclosure is directed at solving the above problems and other problems as summarized below.

SUMMARY

According to one embodiment, a rack for supporting an article on a rear hatch of a vehicle includes a bracket mounted to an inner panel of the rear hatch. The rack also includes a hinge having a fixed portion mounted to the bracket and a pivotable portion. A support bar is connected to the pivotable portion and includes an article-receiving member. The support bar is pivotable via the hinge between a stowed position in which the support bar is nested with the rear hatch and a carrying position in which the support bar extends outwardly from the rear hatch allowing an article to be disposed on the article-receiving member.

According to another embodiment, a vehicle rear hatch includes an outer panel and an inner panel attached to the outer panel. The rear hatch further includes an associated bicycle rack having a bracket assembled to the inner panel and a carrying member pivotably connected to the bracket. The carrying member is pivotable between a stowed position inside the outer panel and a deployed position extending rearwardly from the outer panel. A trim component is arranged to conceal the bicycle rack from view when in the stowed position.

According to yet another embodiment, a bicycle rack of a vehicle includes a pair of brackets mounted to an inner panel of the vehicle and a pair of support bars pivotably connected to one of the brackets. Each of the support bars is pivotable between a stowed position in which the support bars are nested with a body structure of the vehicle and a carrying position in which the support bars extend outwardly from the vehicle. Each of the support bars has a bicycle cradle configured to carry a bicycle or other object.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
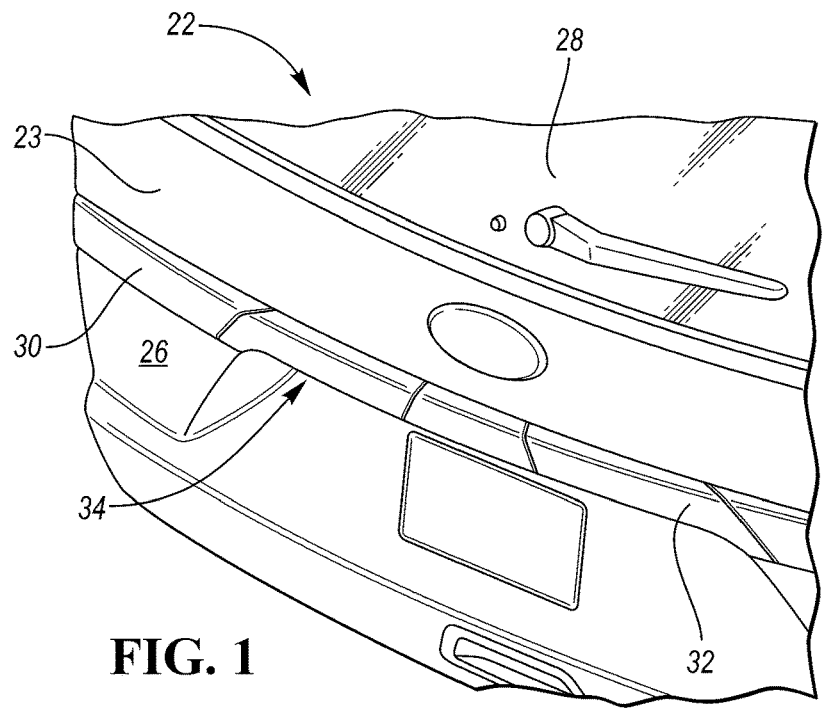
FIG. 1 is a fragmentary perspective view of a rear hatch of a vehicle having an article-carrying device in a stowed position.
Figure 2:
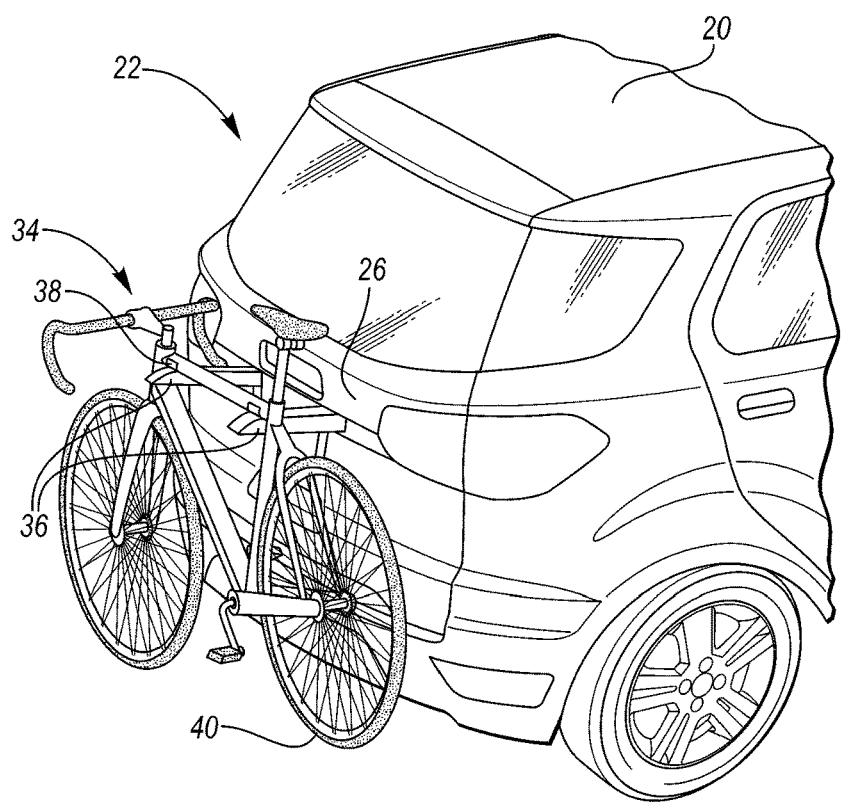
FIG. 2 is a fragmentary perspective view of a rear portion of vehicle having an article-carrying device deployed from the rear hatch of the vehicle and carry a bicycle.

Referring to FIGS. 1 and 2, a vehicle 20 includes a rear hatch 22 having a body portion 23 and a glass portion 28. The rear hatch 22 has a class-A surface that is formed of a combination of an outer panel 26 and trim components such as stationary trim component 30 and moveable trim component 32. The outer panel 26 may be formed of metal or a composite material. The trim components may be formed of plastic, metal, or any suitable material.

The vehicle 20 includes an integrated article-carrying device that deploys from the vehicle. In one embodiment, the article-carrying device is a bicycle rack 34. Unlike aftermarket bicycle racks that attach to a trailer hitch or a bumper assembly of the vehicle and must be removed by the user when not in use, the bicycle rack 34 is original equipment and is stored on the vehicle even when not in use to provide increased convenience and reliability. The bicycle rack 34 is movable between a stowed position (FIG. 1) and a carrying (or deployed) position (FIG. 2). In the stowed position, the support bars 36 (also known as carrying members) of the bicycle rack 34 are hidden behind the trim component 32. In the carrying position, the support bars 36 extend rearwardly from the outer panel 26 so that a bicycle 40 may be placed on a cradle 38 (also referred to as an article-receiving member) that is attached to the support bars 36. The trim component 32 may be mounted to the support bars 36 or pivotally mounted to the outer panel 26. The trim components 32 swivel open allowing the support bars 36 to swing out of the vehicle. The bicycle rack 34 may be manually deployed or maybe automatically deployed by at least one actuator.

The cradle 38 may include a curved surface designed to engage with the tubular frame of the bicycle 40. In other embodiments, the cradle 38 may be specifically designed to accommodate other types of articles to be carried. In yet another embodiment, the cradle 38 may be an adjustable component that can be adjusted to carry a plurality of different articles.

Figure 3:
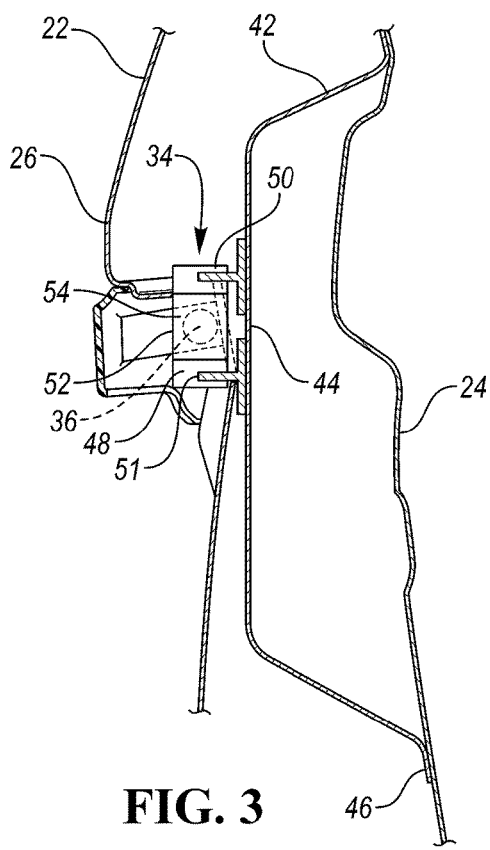
FIG. 3 is a side cross-sectional view of a portion of the rear hatch.
Figure 4:
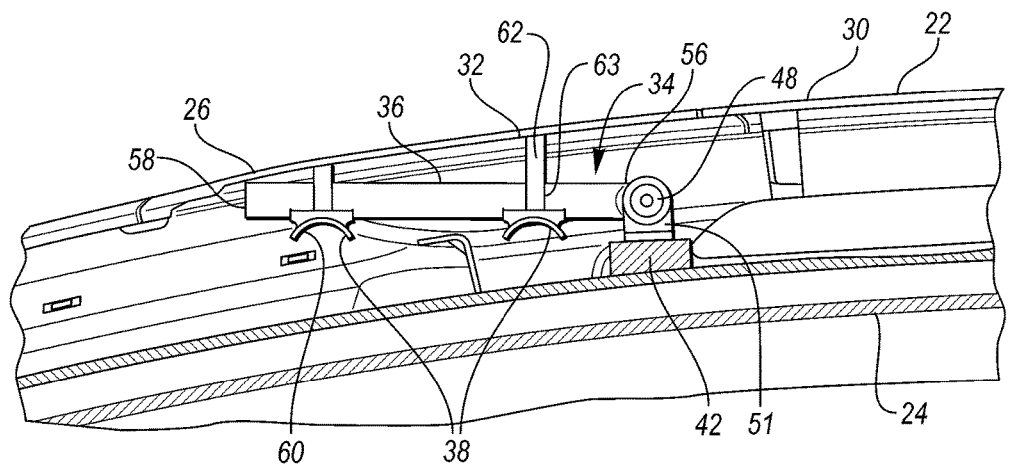
FIG. 4 is a bottom cross-sectional view of a portion of the rear hatch.

Referring to FIGS. 3 and 4, the support bars 36 nest between the inner panel 24 and the outer panel 26 of the rear hatch 22 when in the stowed position. Each of the support bars 36 may include an associated bracket 42 having flanges 46 secured to the inner panel 24. The flange 46 may be welded or fastened to the inner panel 24. The inner panel 24 may be reinforced near the bracket 42 with additional panel thickness or reinforcement plates to accommodate the extra load associated with the bicycle rack and articles supported on the rack. Each support bar has an associated hinge 48 having an upper fixed portion 50 and a lower fixed portion 51 that are each attached to a mounting surface 44 of the bracket 42. A pivotable portion 52 of the hinge 48 is disposed between the fixed portions and is pivotable relative to the fixed portions allowing the support bar 36 to swing between the stowed position and the carrying position.

Each of the support bars 36 includes a distal end 58 and a proximal end 56. The proximal end 56 is connected to a barrel 54 of the pivotable portion 52. The support bar 36 may be a tubular member having a hollow center or may be a solid rod. The movable trim component 32 may be attached to the support bar 36 by one or more connecting members 62. The connecting members may be integrally formed with the trim component 32. The connecting members 62 orient the trim component 32 in alignment with the stationary trim components 30 when the bicycle rack 34 is in the stowed position. One or more cradles 38 are connected to each support bar 36. The cradles 38 are directly connected to the support bar 36 or to the connecting members 62. In some embodiments, the cradles 38 are integrally formed with the connecting members 62 and are a portion of the trim component 32. In this embodiment, the connecting members 62 define a hole 63 that receives the support bar therethrough. In one embodiment, the cradle 38 includes a C-shaped body having an arcuate portion 60 designed to partially encircle a bicycle frame. While not shown, rubber or other soft material may be attached to the article-engaging side of the cradles 38 to increase the coefficient of friction between the cradle and the bicycle and prevent scratching of the bicycle.

Figure 5A:
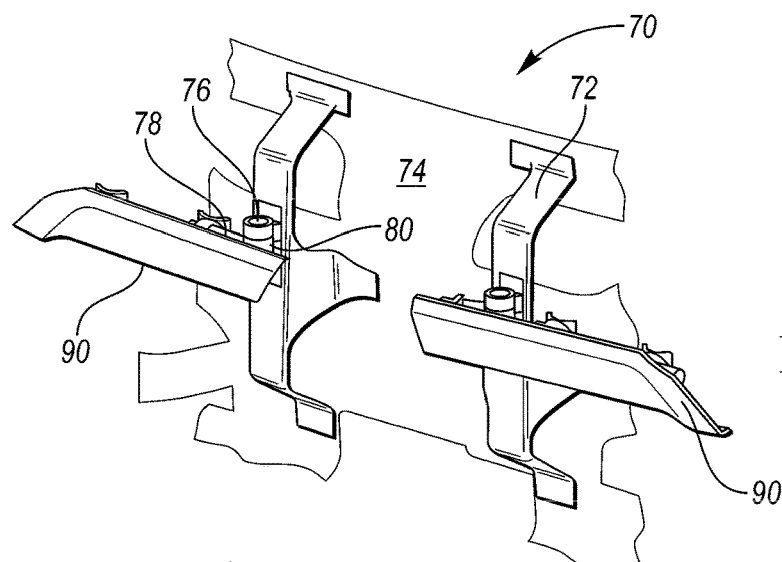
FIG. 5A is a perspective view of a manual article-carrying device in a stowed position.
Figure 5B:
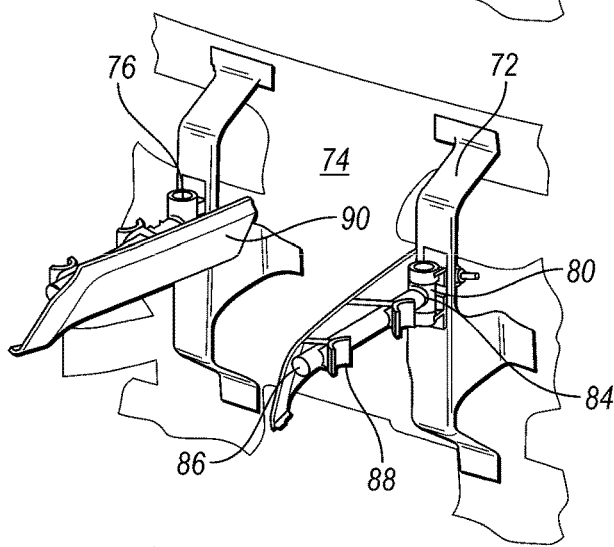
FIG. 5B is a perspective view of the manual article-carrying device in a partially deployed position.
Figure 5C:
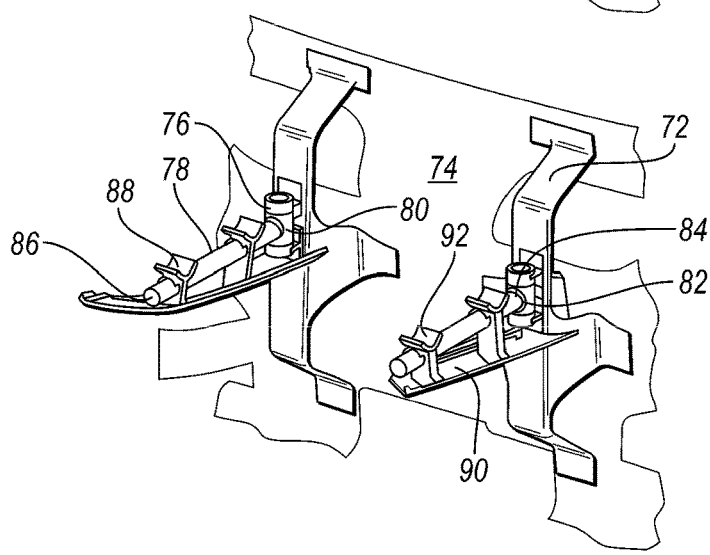
FIG. 5C is a perspective view of the manual article-carrying device in a fully deployed position.

FIGS. 5A through 5C illustrate a manual deployment sequence for an example bicycle rack 70. The bicycle rack 70 includes brackets 72 each connected to an inner panel 74 of a vehicle body component. A hinge 76 pivotally connects one of the support bars 78 to one of the brackets 72. Each hinge 76 includes a pivotal barrel portion 80. A proximal end 84 of the support bar 78 is connected to the barrel portion 80. The support bar 78 may be rotatable relative to the barrel portion 80. In some embodiments, the barrel portion 80 defines a hole 82, and the proximal end 84 is received through the hole 82 such that the support bar 78 is rotatable within the hole. A bearing or similar device may be provided to allow relative movement between the components and to connect the components to each other. The support bar 78 is an elongated member that extends from the proximal end 84 to a distal end 86. One or more cradles 88 are assembled to each support bar 78 between the proximal end 84 and the distal end 86. A trim component 90 is attached to each support bar 78.

In the stowed position (FIG. 5A), the bicycle rack 70 is nested between the inner panel 74 and the outer panel of the body component (not shown) with the support bars 78 being pivoted to be generally parallel to the inner panel 74. The trim component 90 is aligned with the other trim components and the outer panel 26 (shown in FIGS. 1 and 2) to conceal the bicycle rack 70 from view. The cradles 88 may be oriented with the arcuate portions facing the inner panel 74 when in the stowed position. The bicycle rack 70 may be rotated from the stowed position (FIG. 5A) to the carrying position (FIG. 5C) by a two-step process as described below with reference to FIGS. 5B and 5C.

Referring to FIG. 5B, each of the support bars 78 is pivoted in the first step, approximately 90° about an axis extending vertically through the hinge, to extend outwardly from the vehicle. For example, the bicycle rack 70 may be located in a rear hatch and extend rearwardly from the outer panel 26 of the rear hatch. Referring to FIG. 5C, each of the support bars 78 is rotated in the second step approximately 90° about its longitudinal axis to rotate the trim component 90 out of the way and place the cradles 88 into a carrying position with the bicycle-engaging surface 92 of the cradles 88 facing upwardly.

Figure 6A:
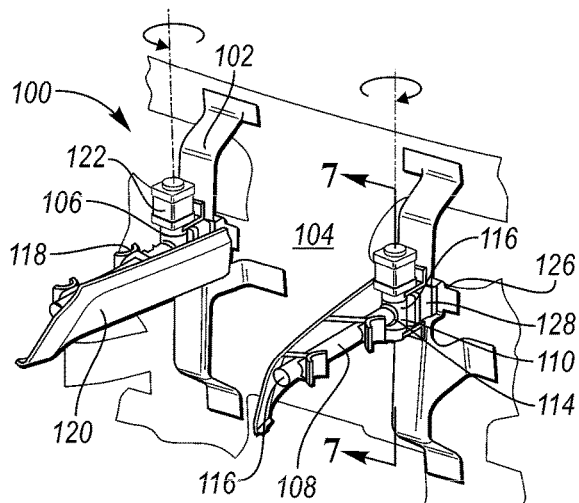
FIG. 6A is a perspective view of the automatic article-carrying device in a partially deployed position.
Figure 6B:
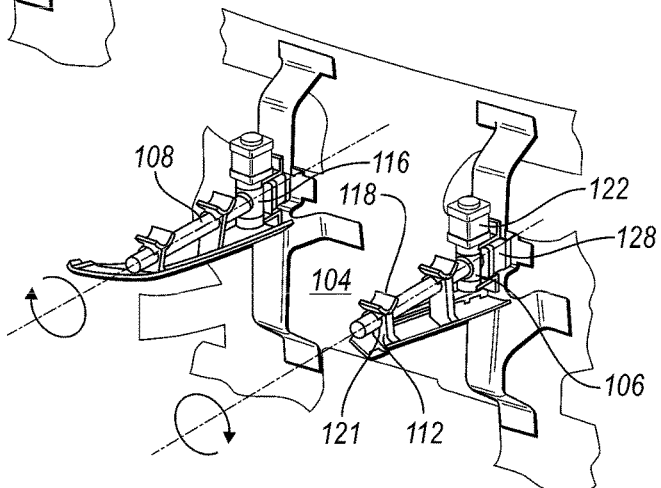
FIG. 6B is a perspective view of the automatic article-carrying device in a fully deployed position.

FIGS. 6A and 6B illustrate an automatic deployment sequence for another example bicycle rack 100. The bicycle rack 100 includes brackets 102 that are each connected to an inner panel 104. A hinge 106 pivotally connects one of the support bars 108 to a corresponding bracket 102. The supports bars 108 may be welded to the barrel portions of the hinge 76. The support bar 78 is an elongated hollow tube that extends from the proximal end 114 to a distal end 116. Each support bar includes an associated trim component 120 that includes a connecting member 112 and a cradle 118. The connecting member 112 defines a hole 121 that receives the support bar 108. The trim components 120 are rotatable about the support bars 108.

The bicycle rack 100 may be rotated from the stowed position to the carrying position by a two-step process. In the first step (FIG. 6A), each of the support bars 108 is pivoted about the hinge to extend outwardly from the vehicle. The support bars 108 are pivoted by an electric motor 122 that is connected to the barrel portion 110. The electric motor 122 is electrically connected to a vehicle controller by wires. Alternatively, the electric motor 122 may be wireless connected to the controller. A push-button switch (or similar device) is actuated to send an electric signal to the controller requesting deployment of the bicycle rack 100. The push-button switch may be located on the vehicle or on a key fob. In response to the push-button switch being actuated, the controller sends a signal to the motor 122 causing the support bars 108 to pivot outwardly from the vehicle. The bracket 102 includes a bulging portion 126 providing clearance for a second electric motor 128 when the support bars swing out.

In the second step (FIG. 6B), the motors 128 rotates the trim components 120, about the support bars, to position the cradles 118 in the carrying positon and to rotate the trim component 120 out of the way. Each of the second motors 128 may be attached to one of the barrel portions 110 at a location on the opposite side of the barrel portions 110 from the support bar 108. The motor 128 is electrically connected to the controller. The controller includes logic that actuates the second motor in response to completion of the first step. The support arms 108 are retractable from the deployed position to the stowed position by the motors 122, 128 in response to a user pressing the push-button switch a second time.

Figure 7:
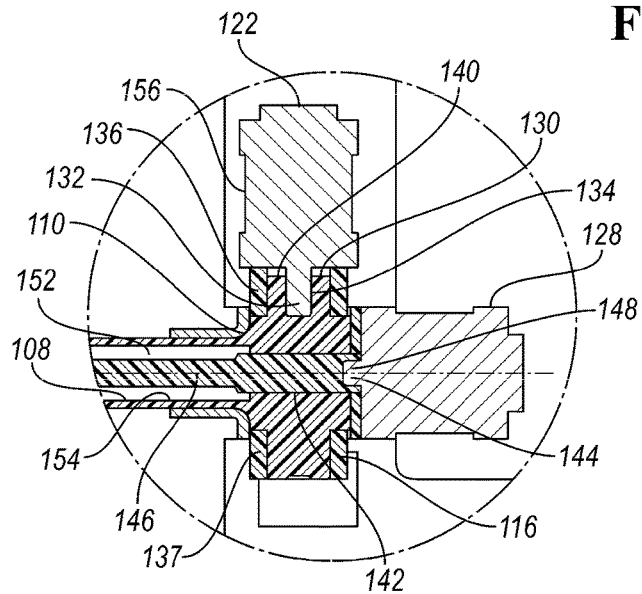
FIG. 7 is a cross-sectional view of the automatic article-carry device taken along the line 7-7 in FIG. 6A.

Referring to FIG. 7, the barrel portion 110 is connected to an upper fixed portion 136 and a lower fixed portion 137 of the hinge 106. The upper fixed portion 136 defines a hole 140 that receives an upper member 130 of the barrel portion 110. The upper member 130 defines a hole 134 that receives a spindle 132 of the motor 122. A housing 156 of the motor 122 is rigidly attached to the fixed portion 136. The spindle 132 pivots the barrel portion 110 relative to the fixed portions 136, 137. The spindle 132 and the hole 134 are interlocked by a key, detents, or similar element to prevent relative movement between the spindle 132 and the upper member 130.

Figure 8:
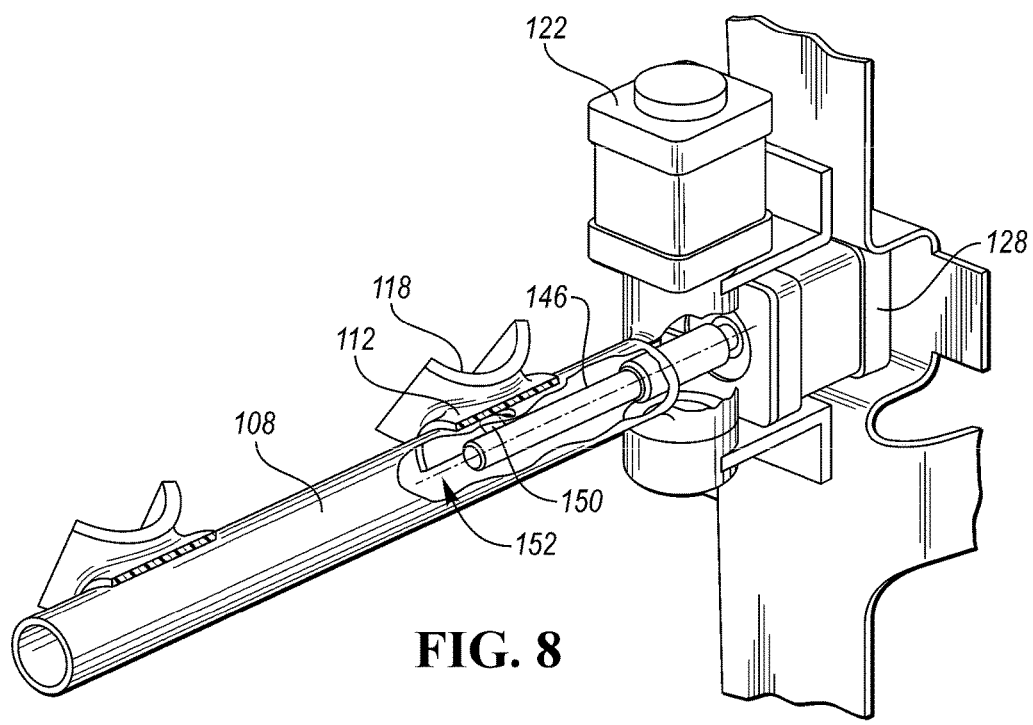
FIG. 8 is a cutaway perspective view of the automatic article-carry device.
Figure 9:
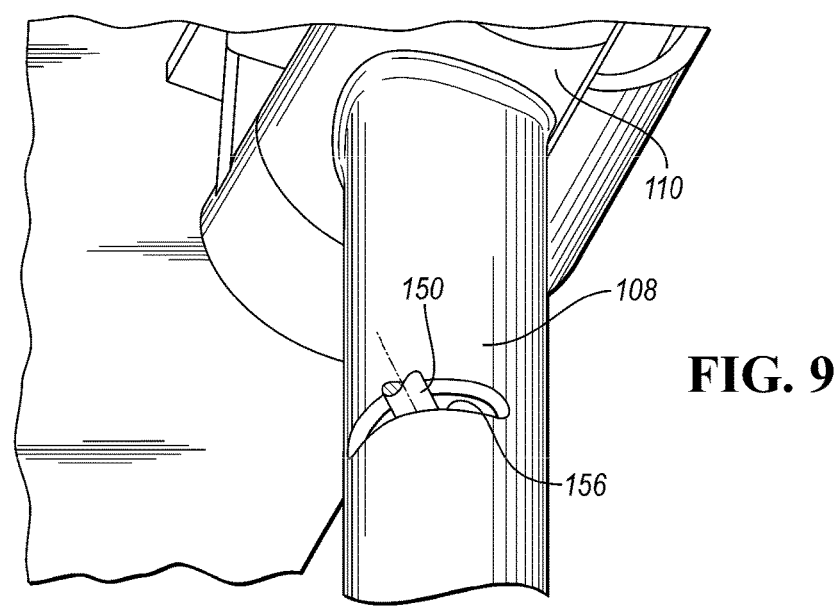
FIG. 9 is a fragmentary perspective view of the automatic article-carry device.

Referring to FIGS. 7, 8, and 9, the support bar 108 is a tube having a hollow center 152 with an inner surface 154. A driveshaft 146 is disposed in the tube and driveably connects the motor 128 to the trim components 120. A connecting member 150 extends through an opening 156 in the support bar 108 to connect the trim component 120 to the driveshaft 146. The driveshaft 146 defines a hole 148 that receives the spindle 144 of the motor 128. The driveshaft 146 rotates the trim component 120 when spindle 144 rotates.

The driveshaft 146 is connected to the spindle 144 of the second motor 128 through a bore 142 defined by the barrel portion 110. A portion of the spindle 144 may also be disposed in the bore 142. The motor 128 includes a housing that is fixed to the outer surface of the barrel portion 110. Rotation of the spindle 144 causes the trim components 120 to rotate about the support bars 108.

The motors 122, 128 may be arranged with their respective spindles oriented at approximately 90° relative to each other. In the illustrated example, the spindle 132 is substantially vertical and the spindle 144 is substantially horizontal. It is to be understood, however, that the motors may be arranged in other orientations.

The above illustrated embodiments and related text describe a support bar that pivots about a vertical axis, but it is to be understood that the support bar and hinge may be arranged in other orientations. For example, the hinge may be positioned to have a horizontal pivot axis to pivot the support bars out of the vehicle body from above or below the hinge rather than from the side as illustrated above. The hinge and support bar may also pivot about an oblique axis. The orientation of the disclosed hinge and support bars can be modified to aesthetically blend in with the trim features of the vehicle or the class-A surface of the outer panel.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A rack for supporting an article on a rear hatch of a vehicle comprising:
a bracket mounted to an inner panel of the rear hatch;
a hinge including a fixed portion mounted to the bracket and a pivotable portion movable about a substantially vertical pivot axis of the hinge; and
a tubular support bar connected to the pivotable portion and being pivotable about the vertical pivot axis via the hinge between a stowed position in which the support bar is nested with the rear hatch and a carrying position in which the support bar extends outwardly from the rear hatch, wherein the support bar includes an article-receiving member that is rotatable about a longitudinal axis of the support bar to place the article-receiving member in an upwardly facing position when in the carrying position allowing an article to be disposed on the article-receiving member;
a first electric motor connected to the pivotable portion to pivot the support bar about the hinge to move the support bar between the stowed position and the carrying position;
a second electric motor connected to the pivotable portion and including a spindle extending into an interior of the support bar;
a driveshaft disposed in the interior of the support bar and connected to the spindle to be rotatable about a longitudinal axis of the support bar;
an article-receiving member rotatably seated on the supported bar and connected to the driveshaft, wherein rotation of the spindle rotates the article-receiving member about the longitudinal axis of the support bar to place the article-receiving member in an upwardly facing position when in the carrying position allowing an article to be disposed on the article-receiving member; and
a trim component connected to and supported by the article-receiving member such that the trim component rotates about the longitudinal axis of the support bar in unison with the article-receiving member to be under the article-receiving member when in the carrying position and nest with the rear hatch when in the stowed position.

2. The rack of claim 1 further comprising:
a second bracket mounted to the inner panel;
a second hinge including a fixed portion mounted to the second bracket and a second pivotable portion movable about a substantially vertical pivot axis of the second hinge; and
a second support bar connected to the second pivotable portion and being pivotable about the vertical pivot axis via the second hinge between a stowed position in which the second support bar is nested with the rear hatch and a carrying position in which the second support bar extends outwardly from the rear hatch allowing, wherein the second support bar includes a second article-receiving member that is rotatable about a longitudinal axis of the second support bar to place the second article-receiving member in an upwardly facing position when in the carrying position allowing the article to be disposed on the second article-receiving member.

3. The rack of claim 1, wherein the pivotable portion defines an aperture and a proximal end of the support bar is disposed in the aperture.

4. The rack of claim 1, wherein the article-receiving member further includes an article-engaging surface that faces the inner panel when in the stowed position.

5. The rack of claim 4, wherein the article-engaging surface in an upwardly facing position when in the carrying position.

6. The rack of claim 1, wherein each of the first and second electric motors further includes a spindle, and the spindles are oriented at 90 degrees relative to each other.

7. The rack of claim 1, wherein the article-receiving member defines a C-shaped body adapted to engage a bicycle frame.

8. A vehicle rear hatch comprising:
an outer panel;
an inner panel;
a bicycle rack including:
a bracket assembled to the inner panel, and
a carrying member connected to the bracket by a vertical-axis hinge to be pivotable between stowed and deployed positions, the carrying member including a cradle rotatable about a longitudinal axis of the carrying member; and a trim component solely supported by the carrying member and arranged to rotate with the cradle, wherein the trim component is rotatable about the longitudinal axis of the carrying member to position the trim component below the carrying member when in the deployed position and to conceal the bicycle rack from view when in the stowed position.

9. The vehicle rear hatch of claim 8, wherein the hinge includes a fixed portion mounted to the bracket and a pivotable portion connected to the carrying member.

10. The vehicle rear hatch of claim 9 further comprising a first electric motor connected to the pivotable portion to pivot the carrying member between the stowed and deployed positions.

11. The vehicle rear hatch of claim 10 further comprising a second electric motor drivably connected to the cradle and to rotate the cradle about the longitudinal axis.

12. The vehicle rear hatch of claim 11, wherein each of the first and second electric motors further includes a spindle, and the spindles are oriented at 90 degrees relative to each other.

13. A bicycle rack of a vehicle comprising:
a pair of brackets mounted to an inner panel of the vehicle;
a pair of support bars each having a bicycle cradle and being directly connected to one of the brackets by a hinge to be pivotable between a stowed position where the support bars are nested with a body structure of the vehicle and a carrying position where the support bars extend outwardly from the vehicle, wherein the hinges have vertical pivot axes;
a pair of first motors each connected to one of the hinges and operable to swing a corresponding one of the support bars between the stowed and carrying positions;
a pair of second motors operable to rotate a corresponding one of the bicycle cradles about a longitudinal axis of a corresponding one of the support bars; and
a pair of driveshafts each disposed within an interior of one of the support bars and connected between a corresponding one of the bicycle cradles and a corresponding one of the second motors.

14. The vehicle rear hatch of claim 13, wherein each of the first and second electric motors further includes a spindle, and the spindles are oriented at 90 degrees relative to each other.

* * * * *